United States Patent
Akasaka et al.

(10) Patent No.: US 9,312,543 B2
(45) Date of Patent: Apr. 12, 2016

(54) FUEL CELL

(75) Inventors: Yoshihiro Akasaka, Kanagawa-ken (JP);
Masato Akita, Kanagawa-ken (JP);
Ryosuke Yagi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/354,977

(22) Filed: Jan. 20, 2012

(65) Prior Publication Data
US 2012/0156587 A1  Jun. 21, 2012

Related U.S. Application Data

(63) Continuation of application No. PCT/JP2009/003394, filed on Jul. 21, 2009.

(51) Int. Cl.
  *H01M 4/86* (2006.01)
  *H01M 8/02* (2006.01)
  *H01M 8/10* (2006.01)

(52) U.S. Cl.
  CPC ............ *H01M 4/861* (2013.01); *H01M 8/0245* (2013.01); *H01M 8/1004* (2013.01); *Y02E 60/521* (2013.01)

(58) Field of Classification Search
  CPC ........................... H01M 4/861; H01M 8/1004
  USPC ......... 429/483, 480, 481, 484, 523, 530, 531, 429/532, 498
  See application file for complete search history.

(56) References Cited

U.S. PATENT DOCUMENTS

| 7,759,019 B2 | 7/2010 | Mei et al. | |
|---|---|---|---|
| 2006/0204832 A1* | 9/2006 | Mei et al. | 429/44 |
| 2007/0218348 A1* | 9/2007 | Tanaka et al. | 429/44 |
| 2010/0047652 A1 | 2/2010 | Song et al. | |

FOREIGN PATENT DOCUMENTS

| JP | 8-22828 | 1/1996 |
|---|---|---|
| JP | 2001-250564 | 9/2001 |
| JP | 2001-338651 | 12/2001 |
| JP | 2004-296435 | 10/2004 |
| JP | 2006-253030 | 9/2006 |
| JP | 2007-250496 | 9/2007 |

OTHER PUBLICATIONS

Notice of Reasons for Refusal issued by the Japanese Patent Office on Mar. 13, 2013, for Japanese Patent Application No. 2011-523484, and English-language translation thereof.

* cited by examiner

*Primary Examiner* — Ula C Ruddock
*Assistant Examiner* — Thomas Parsons
(74) *Attorney, Agent, or Firm* — Finnegan, Henderson, Farabow, Garrett & Dunner, LLP (57) ABSTRACT

In one embodiment, in a fuel cell, a first electrode supplied with an oxidant gas includes a first gas diffusion layer having a first porous base material and a first catalyst layer having a second porous base material. The first catalyst layer is stacked to the first gas diffusion layer. The second porous base material has a pore diameter distribution with a peak in a range of 0.04 μm to 0.12 μm, and a volume ratio of pores with diameters of 0.04 μm to 0.12 μm to all the pores being 17% or more. A second electrode supplied with a fuel includes a second gas diffusion layer having a third porous base material and a second catalyst layer having a fourth porous base material. The second catalyst layer is stacked to the second gas diffusion layer. An electrolyte film is held between the first and second catalyst layers.

11 Claims, 8 Drawing Sheets

| HEAT TREATMENT TEMPERATURE (°C) | CELL VOLTAGE (V) INITIAL | RESIDUAL RATIO (%) 2000H | RESIDUAL RATIO (%) 5000H |
|---|---|---|---|
| 200 | 0.444 | 94 | 84 |
| 170 | 0.458 | 81 | 52 |
| 150 | 0.465 | 75 | 38 |
| COMPARATIVE EXAMPLE | 0.467 | 72 | 30 |

FUEL CELL

CROSS REFERENCE TO RELATED APPLICATION

This is a Continuation Application of International Patent Application No. PCT/JP2009/003394 filed on Jul. 21, 2009, the entire contents of which are incorporated herein by reference.

FIELD

Embodiments described herein relate generally to a fuel cell.

BACKGROUND

A fuel cell has been known, whose cell characteristics including a cell voltage are enhanced by preventing the stay of water in an electrode layer, particularly the stay of water in and around an interface between a gas diffusion layer and a catalyst layer (see Japanese Patent Application Publication No. 2001-338651, for example).

The cell voltage of the fuel cell is enhanced by setting the pore diameters of pores in the catalyst layer and the gas diffusion layer in each of the anode and cathode in a way that a pore diameter distribution has a peak in a range not greater than 0.1 μm, preferably in a range of 0.03 μm to 0.05 μm.

However, the fuel cell has a problem that the fuel cell is not sufficiently reliable due to a long-term characteristic in which the cell voltage decreases to a large extent over time, although the fuel cell provides a high cell voltage as an initial characteristic.

In addition, Japanese Patent Application Publication No. 2001-338651 states that it is desirable that in the pore diameter distribution, a peak area in a range not greater than 0.1 μm should occupy not less than 5% of a total peak area in order to obtain a practical effect of the aforementioned setting, but includes neither any description nor suggestion concerning a relationship between the pore diameter distribution and the time dependency of the cell voltage.

DETAILED DESCRIPTION

In one embodiment, in a fuel cell, a first electrode includes a first gas diffusion layer having a first porous base material and a first catalyst layer having a second porous base material. The first electrode is supplied with an oxidant gas. The first catalyst layer is stacked to the first gas diffusion layer. The second porous base material has a pore diameter distribution with a peak in a range of 0.04 μm to 0.12 μm, both inclusive, and also has a volume ratio of pores with diameters of 0.04 μm to 0.12 μm, both inclusive, to all the pores being 17% or more. A second electrode includes a second gas diffusion layer having a third porous base material and a second catalyst layer having a fourth porous base material. The second electrode is supplied with a fuel. The second catalyst layer is stacked to the second gas diffusion layer. An electrolyte film is held between the first catalyst layer of the first electrode and the second catalyst layer of the second electrode.

Hereinafter, further embodiments will be described with reference to the drawings. In the drawings, same reference characters denote the same or similar portions.

EMBODIMENT

Figure 1:
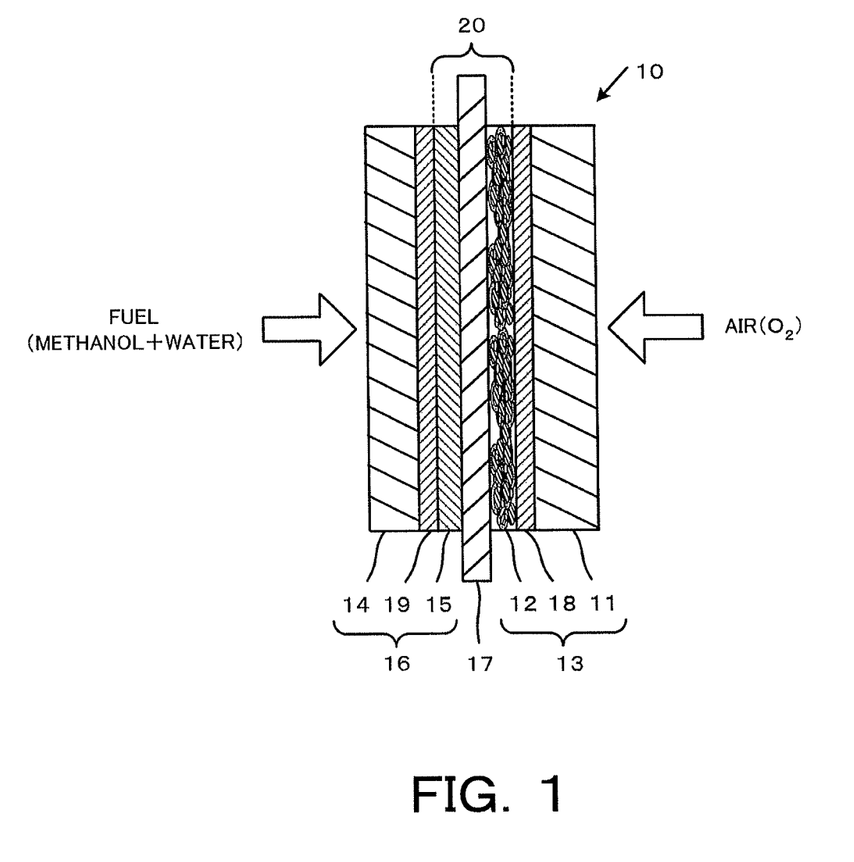
FIG. 1 is a cross sectional view showing a fuel cell according to an embodiment.

As shown in FIG. 1, a fuel cell 10 of the embodiment has a structure in which an electrolyte film 17 is held between a first electrode (hereinafter referred to as an "oxidant electrode") 13, which is supplied with an oxidant gas, and a second electrode (hereinafter referred to as a "fuel electrode") 16, which is supplied with a fuel.

The oxidant electrode 13 has a structure in which a first gas diffusion layer 11 including a first porous base material and a first catalyst layer 12 including a second porous base material are stacked together. The first catalyst layer 12 is in contact with the electrolyte film 17. The fuel electrode 16 has a structure in which a second gas diffusion layer 14 including a third porous base material and a second catalyst layer 15 including a fourth porous base material are stacked together. The second catalyst layer 15 is in contact with the electrolyte film 17.

Oxidant gas supplying means (not illustrated) to supply an oxidant gas (air) is provided to a surface opposed to the first gas diffusion layer 11 of the oxidant electrode 13. Fuel supplying means (not illustrated) to supply liquid fuel (methanol) is provided to a surface opposed to the second gas diffusion layer 14 of the fuel electrode 16.

The first gas diffusion layer 11 has a porous carbon paper (the first porous base material), for example. The first gas diffusion layer 11 plays a function of supplying the oxidant gas, which is supplied to the first gas diffusion layer 11 from the oxidant gas supplying means, to the first catalyst layer 12. The first gas diffusion layer 11 further plays a function as a collector.

The first catalyst layer 12 includes the porous base material which contains a catalyst-activating material, an electrically-conductive material and a proton-conductive material. The first catalyst layer 12 includes a mixed film (second porous base material) of a mixture of carbon particles carrying Pt catalysts and an ion-exchange resin, for example. The first catalyst layer 12 plays a function of facilitating a reaction in which protons, electrons and oxygen react with one another to produce water.

The second gas diffusion layer 14 has a porous carbon paper (the third porous base material), for example. The second gas diffusion layer 14 plays a function of supplying the liquid fuel, which is supplied to the second gas diffusion layer 14 from the fuel supplying means, to the second catalyst layer 15. The second gas diffusion layer 14 further plays a function as a collector.

The second catalyst layer 15 includes the porous base material which contains a catalyst-activating material, an electrically-conductive material and a proton-conductive material. The second catalyst layer 15 includes a mixed film (fourth porous base material) of a mixture of carbon particles carrying Pt/Ru alloy catalysts and an ion-exchange resin, for example. The second catalyst layer 15 plays a function of facilitating a reaction in which methanol and water react with one another to produce protons, electrons and carbon dioxide.

The electrolyte film 17 is a thin film made of cation-exchange resin, for example, perfluorocarbon sulfonate resin. The electrolyte film plays a function as a traffic channel through which protons and electrons produced in the second catalyst layer 15 move to the first catalyst layer 12.

In addition, the fuel cell 10 has a micro-porous layer 18 between the first gas diffusion layer 11 and the first catalyst layer 12. The micro-porous layer 18 is a mixed body made of a mixture of carbon powder and powder of a water-repellent agent. An example of the water-repellent agent is polytetrafluoroethylene. Furthermore, the fuel cell 10 has a micro-porous layer 19 between the second gas diffusion layer 14 and the second catalyst layer 15. The micro-porous layer 19 has the same constitution as the micro-porous layer 18.

The micro-porous layer 18 is provided in order to make the first gas diffusion layer 11 and the first catalyst layer 12 parallel to each other, and in order to make it hard for liquid water produced by the first catalyst layer 12 to move directly to the first diffusion layer 11. This is the case with the micro-porous layer 19 as well.

The gas diffusion layers and the catalyst layers are generically called electrodes. The oxidant electrode 13 including the first gas diffusion layer 11 and the first catalyst layer 12 is also called a cathode. The fuel electrode 16 including the second gas diffusion layer 14 and the second catalyst layer 15 is also called an anode.

A layered body 20 in which the first catalyst layer 12, the electrolyte film 17 and the second catalyst layer 15 are stacked together is called a catalyst coated membrane (abbreviated to CCM). Hereinafter, the layered body 20 is referred to as a CCM 20.

In the fuel cell 10, the catalysts facilitate the reaction expressed with the following chemical equations, once mixed fuel obtained by mixing methanol and water together is supplied to the fuel electrode 16 from the fuel supplying means and air (oxygen) is supplied to the oxidant electrode 13 from the oxidant gas supplying means. When the fuel electrode 16 and the oxidant electrode 13 are connected together by use of an electric wire, an electric power can be outputted to the outside of the fuel cell 10. For this reason, the fuel cell 10 is also called a direct methanol fuel cell (DMFC).

Fuel Electrode: $CH_3OH+H_2O \rightarrow CO_2+6H^++6e^-$   Equation (1)

Oxidant Electrode: $6H^++(3/2)O_2+6e^- \rightarrow 3H_2O$   Equation (2)

Figure 2:
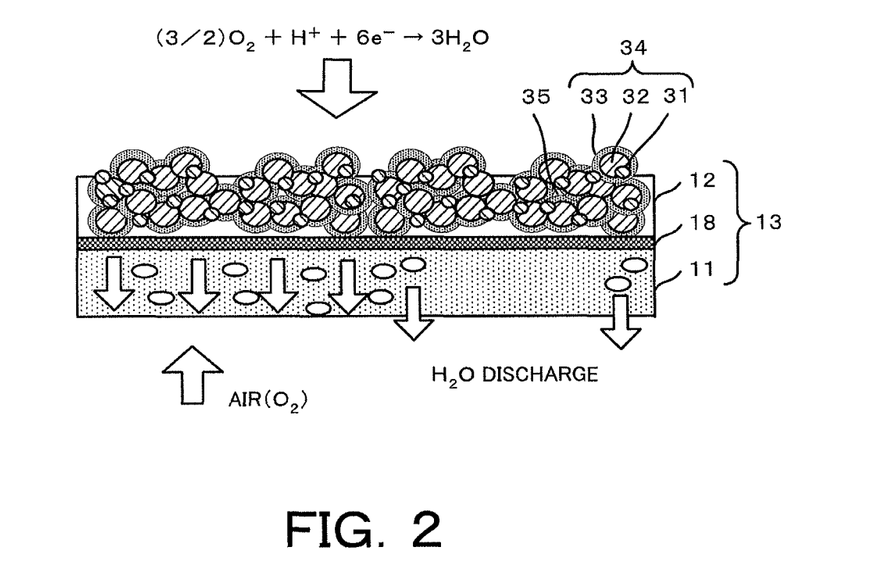
FIG. 2 is a cross sectional view showing a first electrode of the fuel cell according to the embodiment.

FIG. 2 is a cross-sectional view showing the oxidant electrode 13. As shown in FIG. 2, the inside of the first catalyst layer 12 of the oxidant electrode 13 has a structure in which the first catalyst layer 12 is filled with particulate substances 34. Each particulate substance 34 is formed from a carbon particle 32 carrying a Pt catalyst 31, and an ion-exchange resin 33 adhering to the surface of the carbon particle 32.

The particulate substances 34 are bonded together, and pores 35 are formed among the particulate substances 34. Myriad pores 35 are connected together. Water produced by the reaction expressed with Equation (2) scatters through the pores 35 connected together, and reaches the micro-porous layer 18.

After reaching the micro-porous layer 18, the water is vaporized by being heated to 60° C. to 70° C. with the heat of reaction which is produced by the reaction expressed with Equation (2). Although the liquid water cannot pass through the micro-porous layer 18, the gaseous water can pass through the micro-porous layer 18.

The gaseous water having passed through the micro-porous layer 18 is condensed into liquid water while passing through the first gas diffusion layer 11, and the resultant liquid water is discharged to the outside of the first gas diffusion layer 11.

The following four conditions need to be satisfied in order to obtain better fuel cell characteristics. First, an adequate amount of oxidant gas has to be supplied smoothly to the oxidant electrode 13, while an adequate amount of fuel has to be supplied smoothly to the fuel electrode 16. Second, an electrode catalytic reaction has to be caused swiftly in a three-phase interface among the catalyst-activating material, the proton-conductive material and the fuel. Third, electrons and protons have to move smoothly. Fourth, reaction products have to be discharged quickly.

With regard to the oxidant electrode 13, when liquid water produced by the reaction expressed with Equation (2) remains within the first catalyst layer 12 and accordingly covers the reaction site of the first catalyst layer 12, the reaction area of the first catalyst layer 12 decreases, and the decrease hides the diffusion of the oxidant gas, which is essential for the reaction site.

For this reason, the liquid water needs to be prevented from remaining in the first catalyst layer 12 by optimizing the diameter of the pores 35 and the volume ratio of the pores 35 to the first catalyst layer 12.

The diameter of the pores 35 and the volume ratio of the pores 35 to the first catalyst layer 12 depend on the diameter of the carbon particles 32, the film thickness of the ion-exchange resins 33, the manufacturing conditions, and the like. As a result of various studies and examinations, the embodiment determines the diameter of the pores 35 and the volume ratio of the pores 35 to the first catalyst layer 12, as follows. The pore diameter distribution of the mutually-connected pores 35 has a peak in a range of 0.04 µm to 0.12 µm. In addition, the volume ratio of pores with diameters of 0.04 µm to 0.12 µm, both inclusive, to all the pores including pores with diameters below 0.04 µm and above 0.12 µm is set at 17% or more.

Figure 3:
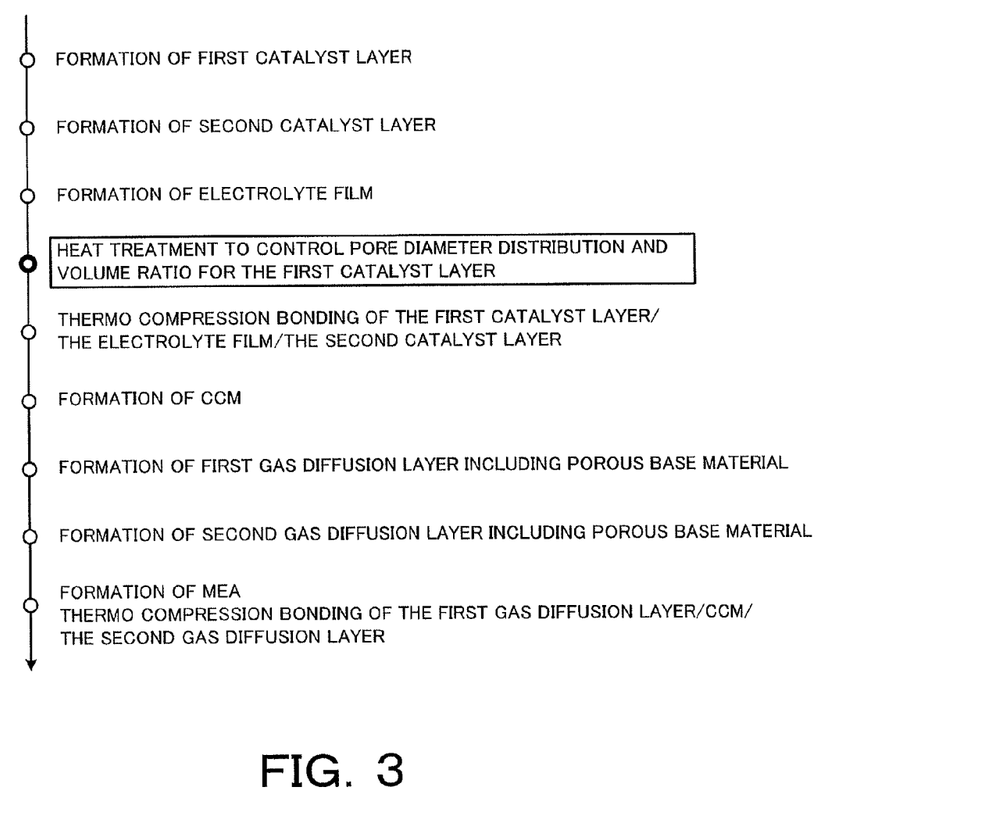
FIG. 3 is a flowchart showing a process of manufacturing fuel cell according to the embodiment.

FIG. 3 is a flowchart showing a process of manufacturing the fuel cell 10 with the constitution described above. As shown in FIG. 3, to begin with, the first catalyst layer 12, the second catalyst layer 15 and the electrolyte film 17 are formed.

The first catalyst layer 12 is formed in the following procedure. A Pt/C catalyst (TEC-TPM70 (trade name) manufactured by Tanaka Kikinzoku Kogyo Co., Ltd., for example, 70 wt % of Pt on Ketjenblack) and a solution of perfluorocarbon sulfonate (Fluka Nafion® 117 Solution manufactured by Sigma-Aldrich Co., LLC, 5 wt % of Nafion) are mixed and dispersed. The resultant mixture is sprayed onto a polytetrafluoroethylene (PTFE) sheet, followed by drying. A loading amount of Pt which is loaded in the first catalyst layer 12 is approximately 2.6 mg/cm², for example.

The second catalyst layer 15 is formed in the following procedure. A Pt/Ru alloy catalyst (Pt/RuBlackHiSPEC6000 (trade name) manufactured by Johnson & Matthey Co., Ltd.), for example and a solution of perfluorocarbon sulfonate (Fluka Nafion® 117 Solution manufactured by Sigma-Aldrich Co., LLC, 5 wt % of Nafion) are mixed and dispersed. A spray of the resultant mixture is applied to a polytetrafluoroethylene (PTFE) sheet, followed by drying. A loading amount of Pt/Ru which is loaded in the second catalyst layer 15 is approximately 6 mg/cm$^2$, for example.

The electrolyte film 17 is formed by applying a publicly-known pretreatment (G. Q., Lu, et al, Electrochemical Acta 49 (2004), pp. 821 to 828) to a perfluorocarbon sulfonate film (Nafion 112® manufactured by DuPont), which is cut approximately 40 mm high and 50 mm wide, for example, by use of hydrogen peroxide and sulfuric acid.

Heat treatment to control the pore diameter distribution and the volume ratio for the first catalyst layer (hereinafter referred to as "heat treatment") is applied to the first catalyst layer 12 in order to obtain the target pore diameter distribution and the volume ratio. A change in the pore diameter distribution and a change in the volume ratio were measured by variously changing the temperature of the heat treatment to 150° C., 170° C. and 200°.

The PTFE sheet on which the first catalyst layer 12 is formed and the PTFE sheet on which the second catalyst layer 15 is formed are cut 30 mm high and 40 mm wide. Thereafter, the first catalyst 12, the second catalyst 15 and the electrolyte film 17 are subjected to thermo-compression bonding with the first catalyst layer 12 overlapping one surface of the electrolyte film 17, with the second catalyst layer 15 overlapping the other surface of the electrolyte film 17, under conditions that the temperature is 125° C., the pressure is 10 kg/cm$^2$, and the time length is 3 minutes, for example.

The first catalyst layer 12 and the second catalyst layer 15 are stripped of the respective PTFE sheets while the first catalyst layer 12 and the second catalyst layer 15 remain in the product of the thermo-compression bonding. Thereby, the CCM 20 is obtained, in which the first catalyst layer 12 having the controlled pore diameter distribution and volume ratio, the electrolyte film 17 and the second catalyst layer 15 are stacked together. The thus-obtained CCM 20 is approximately 100 μm in thickness. In the CCM 20, the first catalyst layer 12 and the second catalyst layer 15 each are approximately 30 μm in thickness.

The first gas diffusion layer 11 on which the micro-porous layer 18 is stacked and the second gas diffusion layer 14 on which the micro-porous layer 19 is stacked are formed. The first gas diffusion layer 11 on which the micro-porous layer 18 is stacked is formed in the following procedure. Slurry obtained by mixing the carbon powder and the water-repellent agent in a solvent is applied to the first gas diffusion layer 11 by the doctor blade method. Thereafter, the solvent is evaporated by drying treatment.

The doctor blade method is of a type used to process powder of a certain material into a homogeneous plate with a certain thickness. Viscous slurry produced by mixing powder of a raw material, a solvent, an antifoaming agent, a resin and the like together is poured into a doctor blade through the inlet port. The viscous slurry is extruded from the doctor blade through a gap between the flat surfaces on the two respective edges and the peak of the mountain-shaped projecting portion in the center. Thereby, the doctor blade offers a film with a certain thickness which is equal to a step between the flat surfaces and the projecting portion.

To put it specifically, examples of the carbon powder to be used to this end include furnace black, acetylene black and graphitized black. Examples of the water-repellent agent to be used to this end include PTFE, tetrafluoroethylene-perfluoroalkylvinylether copolymer (PFA), tetrafluoroethylene-hexafluoropropylene copolymer (FEP), polychlorotrifluoroethylene (PCTFE), polyvinylidene fluoride (PVDF), polyvinyl fluoride (PVF), tetrafluoroethylene-ethylene copolymer (ETFE).

First of all, slurry is formed by homogeneously mixing furnace black (Vulcan XC-72 (trade name) manufactured by Cabot Corporation), which is electrically-conductive carbon, and FEP (manufactured by Mitsui DuPont Fluorochemicals, Co., Ltd., with a concentration of 54 wt %), which is the water-repellent agent, together by using pure water as a solvent in a ball mill. In this respect, FEP is weighed in a way that the ratio of FEP to the mixture is 23 wt %.

The thus-obtained slurry is applied by the doctor blade method onto the carbon paper which is the gas diffusion layer, followed by drying in room temperature. Thereafter, the resultant product is heat-treated in a non-oxidative atmosphere, for example in an argon atmosphere, at a temperature of 380° C. for 15 minutes.

Thereby, the first gas diffusion layer 11 with a thickness of approximately 50 μm on which the micro-porous layer 18 is stacked is obtained. The second gas diffusion layer 14 on which the micro-porous layer 19 is stacked is obtained in a similar manner. Description for how the second gas diffusion layer 14 on which the micro-porous layer 19 is stacked is obtained will be omitted.

Instead, a gas diffusion layer with a micro-porous layer beforehand stacked on the gas diffusion layer (Elate Gas Diffusion Layer LT-2500-W (trade name) manufactured by E-TEK Co., Ltd., for example, with a thickness of 360 μm) may be used.

The CCM 20, the resultant first gas diffusion layer 11, and the resultant second gas diffusion layer 14 are subjected to thermo-compression bonding with the micro-porous layer 18 of the first gas diffusion layer 11 overlapping the first catalyst layer 12 of the CCM 20, and with the micro-porous layer 19 of the second gas diffusion layer 14 overlapping the second catalyst layer 15 of the CCM 20. Thereby, a membrane electrode assembly (MEA) which constitutes a power generating cell is obtained.

The oxidant gas supplying means to supply the oxidant gas is formed on a surface opposed to the first gas diffusion layer 11. The fuel supplying means to supply the fuel is formed on a surface opposed to the second gas diffusion layer 14. Thereby, the fuel cell 10 shown in FIG. 1 is obtained.

Descriptions will be provided for the pore diameter distribution and volume ratio in the first catalyst layer 12. The pore diameter distribution can be found by the mercury penetration method, for example. The volume ratio can be found by a calculation based on the found pore diameter distribution. Otherwise, the volume ratio can be estimated on the basis of the dimension change of the first catalyst layer 12 which corresponds to a compression load.

The mercury penetration method is a method to be used to find a distribution of pores on the basis of pressure which is applied to penetrate mercury into the pores in a sample by using a fact that the surface tension of mercury is high, and an amount of mercury which is penetrated into the pores in the sample.

Because one property of mercury is that mercury makes no substance wet, mercury will not intrude pores in the top surface of the sample as long as mercury is left alone. For this reason, the sample is placed inside a container, and the resultant container is vacuumed, as well as the vacuumed container is subsequently filled with mercury. Once pressure is applied to the mercury, the mercury starts to intrude the pores. As the pressure applied to the mercury is increased, the mercury intrudes smaller pores after intruding larger pores.

A relationship between the applied pressure and the corresponding diameter of pores intruded by the mercury is obtained by a theory-based calculation. If a change in the liquid level of the mercury (an amount of mercury which intrudes pores) is detected by continuously increasing the applied pressure, the pore diameter and volume can be measured. The mercury penetration method enables the pore diameter distribution to be measured in a range of several hundred micrometers to several nanometers.

Figure 4:
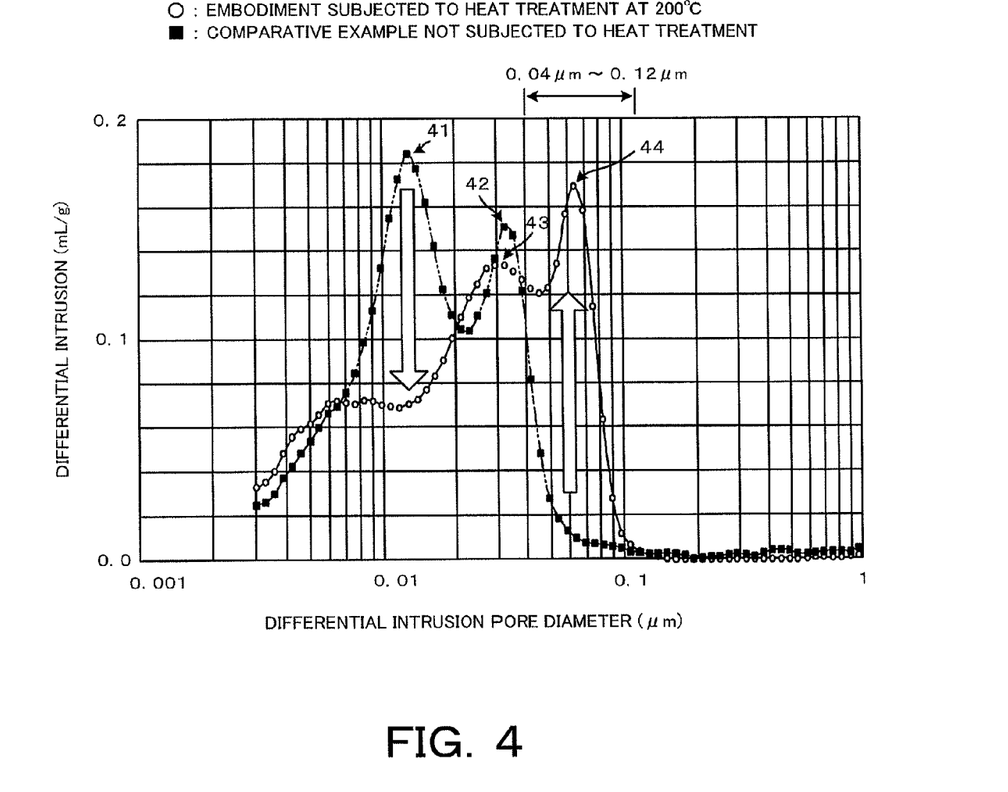
FIG. 4 is a graph showing a comparison between a pore diameter distribution in a first catalyst layer and that of a comparative example according to the embodiment.

FIG. 4 is a graph showing a comparison between the pore diameter distribution in the first catalyst layer 12 and that of a comparative example. In this respect, the comparative example means a first catalyst layer which was not subjected to the heat treatment to control the pore diameter distribution and volume ratio.

As shown in FIG. 4, the first catalyst layer which had not been subjected to the heat treatment had a larger peak 41 in a range of 0.01 μm to 0.02 μm in the pore diameter distribution, and a smaller peak 42 in a range of 0.03 μm to 0.04 μm in the pore diameter distribution.

On the other hand, the first catalyst layer 12 which had been subjected to the heat treatment at 200° C. of the embodiment had a smaller peak 43 (a second peak) in a range of 0.03 μm to 0.04 μm in the pore diameter distribution, and a larger peak 44 (a first peak) in a range of 0.06 μm to 0.07 μm in the pore diameter distribution.

The following phenomena can be learned from the graph. First, the heat treatment at 200° C. made the peak 41 sharply lower in the range of 0.01 μm to 0.02 μm in the pore diameter distribution. Second, the heat treatment at 200° C. made the peak 44 sharply larger in the range of 0.06 μm to 0.07 μm in the pore diameter distribution. Third, the heat treatment at 200° C. did not change the peak 42 so much in the range of 0.03 μm to 0.04 μm in the pore diameter distribution.

One may consider that the reason for the fall of the peak 41 and the rise of the peak 44 due to the heat treatment lay in heat shrinkage in the ion-exchange resins 33 of the respective particulate substances 34 shown in FIG. 2, and the resultant expansion of the gaps among the particulate substances 34.

As a result of the fall of the peak 41 in the range of 0.01 μm to 0.02 μm in the pore diameter distribution, the water produced in the first catalyst layer 12 was inhibited from remaining in fine pores due to the capillarity. Consequently, the probability of the hindrance of the diffusion of the oxidant gas decreased. Furthermore, because of the rise of the peak 44 in the range of 0.06 μm to 0.07 μm in the pore diameter distribution, the probability of the facilitation of the diffusion of the oxidant gas was expected to increase in conjunction with the discharge of the water via the fine pores.

When the temperature of the heat treatment was lower than 200° C., for example 150° C. and 170° C., no peak was detected in the range of 0.06 μm to 0.07 μm in the pore diameter distribution.

Figure 5:
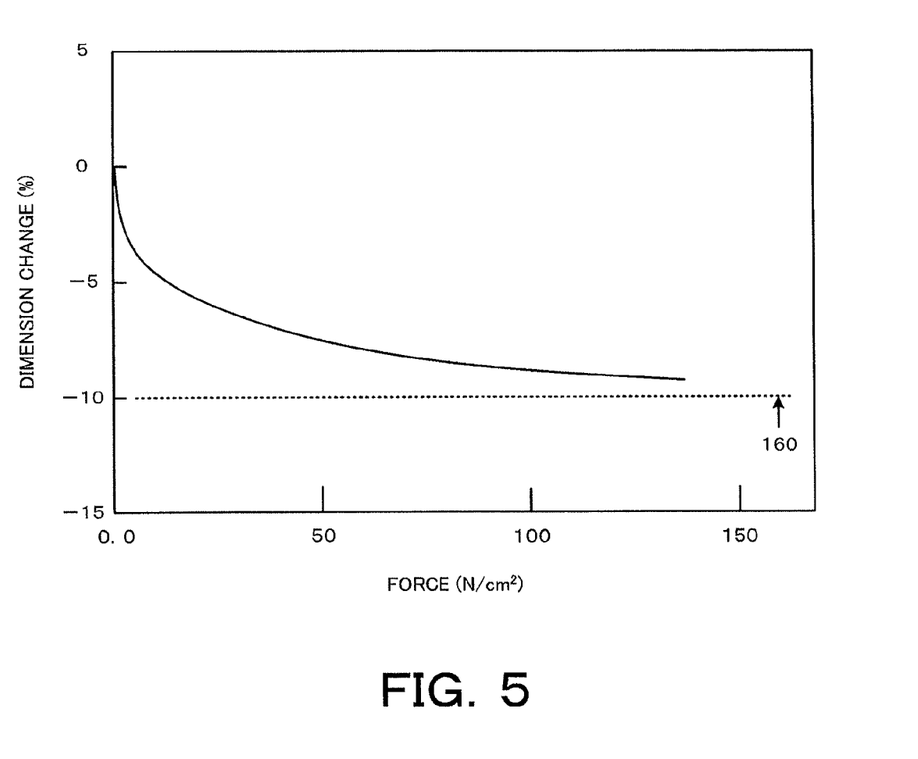
FIG. 5 is a graph showing a relationship between the compression load applied to the first catalyst layer and the dimension change of the first catalyst layer according to the embodiment.

FIG. 5 is a graph showing a relationship between the compression load applied to the first catalyst layer 12 and the dimension change of the first catalyst layer 12. The measurement was carried out by use of a thermo-mechanical analyzer. As shown in FIG. 5, as the compression load applied to the first catalyst layer 12 was increased, the first catalyst layer 12 shrank more. However, the catalyst layer 12 showed a tendency in which the dimension change reaches a saturation level at around −10%.

The volume ratio of pores with diameters of 0.04 μm to 0.12 μm, both inclusive (hereinafter simply referred to as "pores of 0.04 μm to 0.12 μm"), to all the pores was estimated at 24% on the basis of the pore diameter distribution in the first catalyst layer 12 and the dimension change of the first catalyst layer 12 which corresponds to the compression load.

These facts tell that the control of the conditions for the heat treatment, particularly the control of the temperature, makes it possible to obtain the first catalyst layer 12 including the second porous base material in which the pore diameter distribution has the peak in the range of 0.04 μm to 0.12 μm, both inclusive (hereinafter simply referred to as "0.04 μm to 0.12 μm"), and in which the volume ratio of pores of 0.04 μm to 0.12 μm to all the pores is equal to or greater than 17%. One may consider that the saturation of the dimension change of the first catalyst layer 12 at around −10% under the applied compression load of 160 N/cm², particularly the dimensional reduction by 10% or less, is a criterion for judging whether or not the first catalyst layer 12 is obtained.

Although not shown in the graph, the peak in the pore diameter distribution was located at around 0.012 μm when no heat treatment had been applied (representing the comparative example), at around 0.04 μm when the temperature of the heat treatment had been 150° C., and at around 0.05 μm when the temperature of the heat treatment had been 170° C. The volume ratio of pores of 0.04 μm to 0.12 μm to all the pores was approximately 2% when no heat treatment had been applied, approximately 8% when the temperature of the heat treatment had been 150° C., and approximately 17% when the temperature of the heat treatment had been 170° C.

It should be noted that the "pores" and "all the pores" mentioned in the description mean pores which are connected together, and which can be measured by use of the mercury penetration method.

Figure 6:
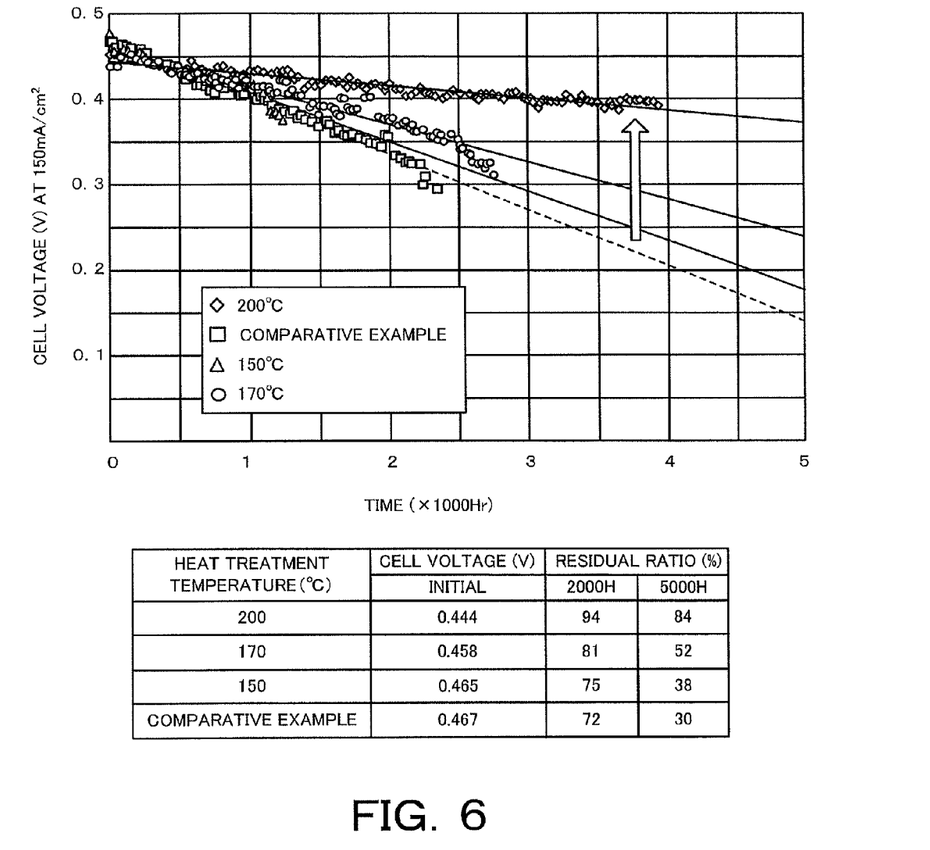
FIG. 6 is a graph and a table which show a comparison between time dependency of the cell voltage and that of the comparative example according to the embodiment.

FIG. 6 is a graph and a table which show a comparison between time dependency of the cell voltage of the fuel cell and that of the comparative example. Each cell voltage was measured under the following conditions. An aqueous solution of methanol with a concentration of one mol per liter was supplied to the fuel electrode at a rate of 0.8 cc/min, while air with an oxygen concentration of 20.5% and a humidity of 40% was supplied to the oxidant electrode at a rate of 60 cc/min. A cell current continued being outputted at a rate of 150 mA/cm².

As shown in FIG. 6, the initial value of the cell voltage was 0.467V for the comparative example, and 0.444V for the embodiment. The initial value of the cell voltage was 0.465V in the case where the temperature of the heat treatment was 150° C., and 0.458V in the case where the temperature of the heat treatment was 170° C. The initial value of the cell voltage tended to decrease as the temperature of the heat treatment rose.

In each case, the cell voltage decreased with time in either example, but the residual ratio of the cell voltage at 2000H was 72% for the comparative example, and 94% for the embodiment. The residual ratio was 75% in the case where the temperature of the heat treatment was 150° C., and 81% in the case where the temperature of the heat treatment was 170° C. By this, it was found that the heat treatment enhanced the residual ratio of the cell voltage remarkably.

In addition, for each case, the residual ratio of the cell voltage at 5000H was calculated by extrapolating the time dependency of the cell voltage. The residual ratio was estimated at 30% for the comparative example, and at 84% for the embodiment. The residual ratio was estimated at 38% in the case where the temperature of the heat treatment was 150° C., and at 52% in the case where the temperature of the heat treatment was 170° C.

Figure 7:
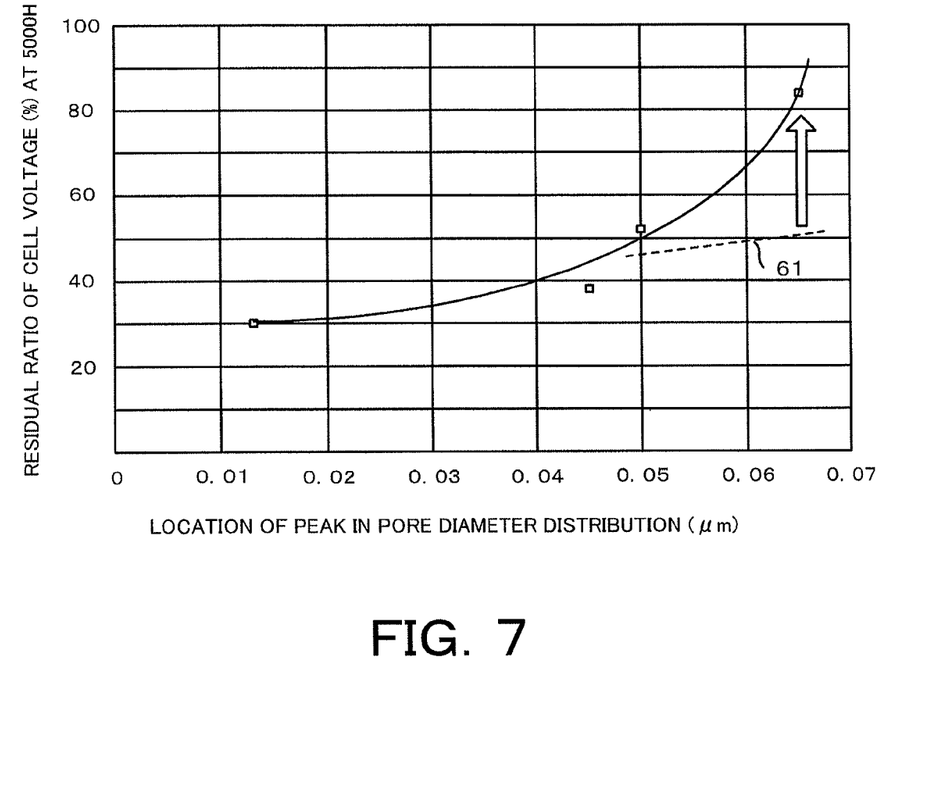
FIG. 7 is a diagram showing a relationship between the location of peak in the pore diameter distribution and the residual ratio of the cell voltage according to the embodiment.

FIG. 7 is a diagram showing a relationship between the location of each peak in the pore diameter distribution and the residual ratio of the cell voltage at 5000H. As shown in FIG.

7, the residual ratio of the cell voltage tended to increase as the location of the peak in the pore diameter distribution became larger. In particular, the residual ratio of the cell voltage tended to increase remarkably when the location of the peak in the pore diameter distribution exceeded 0.04 μm.

This represents a critical characteristic unable to be expected from the broken line 61 obtained by only extrapolating the residual ratios of the cell voltage estimated for the comparative example, and for the case where the temperature of the heat treatment was 150° C. and 170° C.

On the other hand, the initial value of the cell voltage decreased beyond a negligible level when the location of the peak in the pore diameter distribution exceeded 0.12 μm. Judging from these factors, it is suitable that the location of the peak in the pore diameter distribution should fall within a range of 0.04 μm to 0.12 μm.

It is further suitable that the location of the peak in the pore diameter distribution should fall within a range of 0.06 μm to 0.12 μm in order that the residual ratio of the cell voltage at 5000H can be 60% or more, and in order that a stable cell voltage can be secured.

One may consider that a reason for the lower initial value of the cell voltage is as follows. As the diameter of pores becomes larger, the area of the reaction site which contributes to the reaction expressed with Equation (2) in the first catalyst layer 12 becomes smaller. As a result, the internal resistance of the cell becomes larger, and the function of the first gas diffusion layer 11 as the collector becomes lower, thus resulting in increase in the internal loss in the cell.

Figure 8:
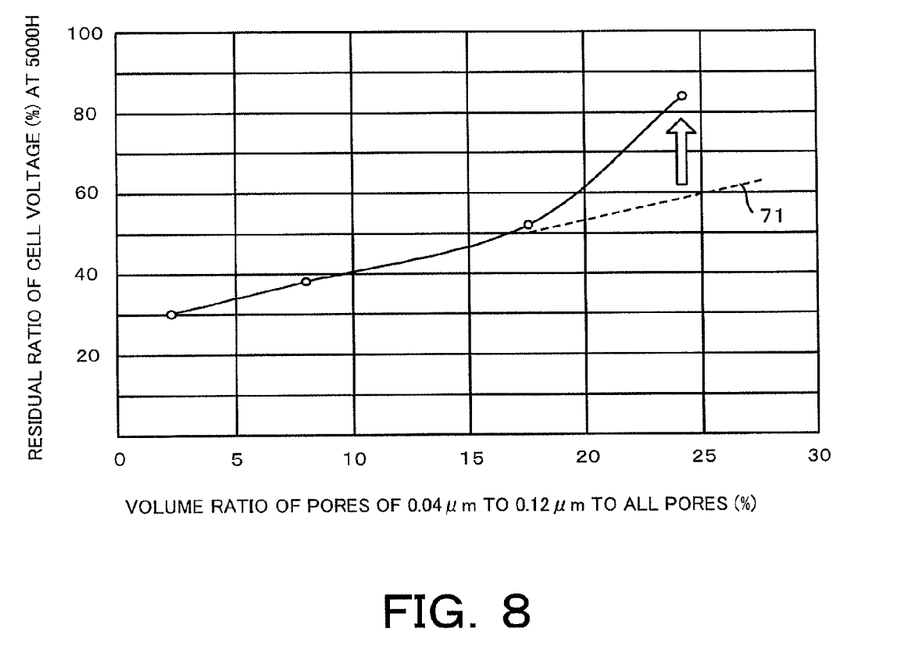
FIG. 8 is a diagram showing a relationship between the volume ratio of pores and the residual ratio of the cell voltage according to the embodiment.

FIG. 8 is a diagram showing a relationship between the volume ratio of pores of 0.04 μm to 0.12 μm to all the pores (hereinafter also referred to as "pore volume ratio") and the residual ratio of the cell voltage at 5000H. As shown in FIG. 8, the residual ratio of the cell voltage tended to increase as the pore volume ratio became larger. In particular, the residual ratio of the cell voltage tended to increase remarkably after the pore volume ratio exceeded 17%.

This represents a critical characteristic unable to be expected from the broken line 71 obtained by only extrapolating the residual ratios of the cell voltage estimated for the comparative example, and for the case where the temperature of the heat treatment was 150° C., and 170° C.

It is suitable that the volume ratio of pores of 0.04 μm to 0.12 μm to all the pores be 25% or more in order to ensure that the residual ratio of the cell voltage at 5000H is 90% or more on the condition that the location of the peak in the pore diameter distribution falls within the range of 0.04 μm to 0.12 μm.

No specific upper limit is imposed on the pore volume ratio. However, it is realistically desirable that the pore volume ratio should be not greater than 50% from a viewpoint of the saturation of the characteristic and from a viewpoint of manufacturing. More desirably, the pore volume ratio should be not greater than 35%.

As described above, the fuel cell 10 of the embodiment includes the first catalyst layer 12 having the second porous base material in which the porous diameter distribution has the peak in the range of 0.04 μm to 0.12 μm, and in which the volume ratio of pores of 0.04 μm to 0.12 μm to all the pores is 17% or more.

As a result, it is possible to inhibit the hindrance of the diffusion of the oxidant gas which is caused by the stay of water in fine pores due to the capillarity, and it is accordingly possible to facilitate the diffusion of the oxidant gas by quickly discharging the water through larger pores.

The larger pores makes it possible to prevent damage on the function of inhibiting the stay of the water and the hindrance of the diffusion of the oxidant gas, as well as the function of facilitating the discharge of the water and the diffusion of the oxidant gas, because the larger pores are less likely to be clogged with the lapse of time, and because even if the pores are clogged, the volume ratio of the larger pores to all the pores is still large. This inhibits the deterioration of the cell voltage, and accordingly makes it possible to obtain a fully reliable fuel cell.

The foregoing descriptions have been provided for the process of manufacturing the fuel cell 10 in which the heat treatment to control the pore diameter distribution and volume ratio is not applied to the second catalyst layer 15. Even if, however, the heat treatment is applied to the second catalyst layer 15, the effects of the embodiment are not lost. In the case where the heat treatment is applied, it is desirable that the heat treatment should be simultaneously applied to the first catalyst layer 12 and the second catalyst layer 15 after the first catalyst layer 12 and the second catalyst layer 15 are bonded to the electrolyte film 17 by thermo-compression. Particularly, the first catalyst layer 12 needs to be handled carefully, because the first catalyst layer 12 becomes fragile after the heat treatment is applied to the first catalyst layer 12. However, if, as mentioned above, the first catalyst layer 12 is subjected to the heat treatment after the first catalyst layer 12 and the second catalyst layer 15 are bonded to the electrolyte film 17 by thermo-compression, the first catalyst layer 12 can be handled easily. This is advantageous to stabilizing the manufacturing process.

In addition, even if no micro-porous layer 19 accompanies the second gas diffusion layer 14, the effects of the embodiment still can be obtained.

What is claimed is:

1. A fuel cell comprising:
   a first electrode including a first gas diffusion layer having a first porous base material and a first catalyst layer having a second porous base material, the first electrode being supplied with an oxidant gas, the first catalyst layer being stacked to the first gas diffusion layer, the second porous base material containing a catalyst-activating material, an electrically-conductive material, and a proton-conductive material, the second porous base material having a pore diameter distribution with a first peak in a range of 0.04 μm to 0.12 μm, both inclusive, and a second peak in a range of 0.02 μm to 0.04 μm, both inclusive, the second porous base material having a volume ratio of pores with diameters of 0.04 μm to 0.12 μm, both inclusive, to all the pores being 17% or more, and the second porous base material having a total volume of the pores with diameters of not less than 0.1 μm being not more than 0.01 mL/g, the total volume being measured by a mercury penetration method;
   a second electrode including a second gas diffusion layer having a third porous base material and a second catalyst layer having a fourth porous base material, the second electrode being supplied with a fuel, the second catalyst layer being stacked to the second gas diffusion layer; and
   an electrolyte film held between the first catalyst layer of the first electrode and the second catalyst layer of the second electrode,
   wherein the catalyst-activating material includes catalysts that are only particles, and
   the first catalyst layer does not substantially include a fibrous supported catalyst.

2. The fuel cell of claim 1, further comprising a micro-porous layer between the first gas diffusion layer and the first catalyst layer, the micro-porous layer including a mixture of carbon powder and a ate repellent agent.

3. The fuel cell of claim 1, wherein
the pore diameter distribution has a peak in a range of 0.06 μm to 0.12 μm, both inclusive.

4. The fuel cell of claim 1, wherein
a dimension change of the first catalyst layer under application of a compression load of 160 N/cm² is not greater than 10%.

5. The fuel cell of claim 1, wherein the second peak is in a range of 0.03 μm to 0.04 μm, both inclusive.

6. The fuel cell of claim 1, wherein the volume ratio of pores with diameters of 0.04 μm to 0.12 μm, both inclusive, is below 50%.

7. The fuel cell of claim 1, wherein the volume ratio of pores with diameters of 0.04 μm to 0.12 μm, both inclusive, is equal to or below 35%.

8. The fuel cell of claim 1, wherein a value of differential intrusion at the first peak is larger than a value of differential intrusion at the second peak.

9. The fuel cell of claim 1, wherein the second porous base material is subjected to heat treatment at a temperature more than about 160° C.

10. A fuel cell comprising:
a first electrode including a first gas diffusion layer having a first porous base material and a first catalyst layer having a second porous base material, the first electrode being supplied with an oxidant gas, the first catalyst layer being stacked to the first gas diffusion layer, the second porous base material containing a catalyst-activating material, an electrically-conductive material, and a proton-conductive material, the second porous base material having a pore diameter distribution with a first peak in a range of 0.04 μm to 0.12 μm, both inclusive, and a second peak in a range of 0.02 μm to 0.04 μm, both inclusive, the second porous base material having a volume ratio of pores with diameters of 0.04 μm to 0.12 μm, both inclusive, to all the pores being 17% or more, and the second porous base material having a volume of the pore with diameter of 0.1 μm being not more than 0.01 mL/g, the volume being measured by a mercury penetration method;
a second electrode including a second gas diffusion layer having a third porous base material and a second catalyst layer having a fourth porous base material, the second electrode being supplied with a fuel, the second catalyst layer being stacked to the second gas diffusion layer; and
an electrolyte film held between the first catalyst layer of the first electrode and the second catalyst layer of the second electrode,
wherein the catalyst-activating material includes catalysts that are only particles, and the first catalyst layer does not substantially include a fibrous supported catalyst.

11. The fuel cell of claim 10, wherein the second porous base material is subjected to heat treatment at a temperature more than about 160° C.

* * * * *